US007321866B2

(12) United States Patent
Kuwana et al.

(10) Patent No.: US 7,321,866 B2
(45) Date of Patent: Jan. 22, 2008

(54) DISH-PROVIDING ASSISTING SYSTEM, DISH-PROVIDING ASSISTING APPLICATION PROVIDING SYSTEM, DISH-PROVIDING ASSISTING SOFTWARE AND RECORDING MEDIUM

(75) Inventors: Kenji Kuwana, Funabashi (JP); Yukiko Inada, Akishima (JP); Takahisa Hanajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 855 days.

(21) Appl. No.: 10/146,912

(22) Filed: May 17, 2002

(65) Prior Publication Data

US 2002/0174015 A1 Nov. 21, 2002

(30) Foreign Application Priority Data

May 18, 2001 (JP) .............................. 2001-149259

(51) Int. Cl.
*G06Q 50/00* (2006.01)
(52) U.S. Cl. ......................................... 705/15; 705/22
(58) Field of Classification Search .................. 705/15, 705/16, 22, 26, 27, 37
See application file for complete search history.

(56) References Cited

U.S. PATENT DOCUMENTS 5,845,263 A * 12/1998 Camaisa et al. ............... 705/27
6,298,331 B1 * 10/2001 Walker et al. ................. 705/15
6,341,268 B2 * 1/2002 Walker et al. ................. 705/15
6,801,228 B2 * 10/2004 Kargman ..................... 715/837
7,032,816 B2 * 4/2006 Markham et al. ........... 235/376
2001/0027473 A1 * 10/2001 Kawakita ..................... 709/204
2002/0013734 A1 * 1/2002 Bueno .......................... 705/26
2002/0023019 A1 * 2/2002 Kawakita ..................... 705/26
2002/0062266 A1 * 5/2002 Aoki ............................ 705/27
2002/0099589 A1 * 7/2002 Rice .............................. 705/9
2002/0103751 A1 * 8/2002 Tanaka ........................ 705/38
2002/0133418 A1 * 9/2002 Hammond et al. ........... 705/26
2003/0059747 A1 * 3/2003 Yoshida et al. .............. 434/127
2003/0065651 A1 * 4/2003 Naito ............................ 707/3
2004/0098282 A1 * 5/2004 Levy et al. ..................... 705/1
2005/0192869 A1 * 9/2005 Maeda et al. ................. 705/26

FOREIGN PATENT DOCUMENTS

| JP | 09-274629 | 10/1997 |
| JP | 10-177598 | 6/1998 |

* cited by examiner

*Primary Examiner*—Gerald J. O'Connor
(74) *Attorney, Agent, or Firm*—Morrison & Foerster LLP

(57) ABSTRACT

A dish provider provides a user with dishes, through a dish-providing assisting server, in cooperation with one or a plurality of dish makers. An ingredient information DB stores date information representing dates before that ingredients should be best used. In response to an order for dishes from the user, the dish maker having ingredients for the dishes in stock searches the ingredient information DB for the date information, and sends an order for a set of dishes to the dish maker. An order for those ingredients used for the ordered dishes is sent to a client device of an ingredient seller.

9 Claims, 8 Drawing Sheets

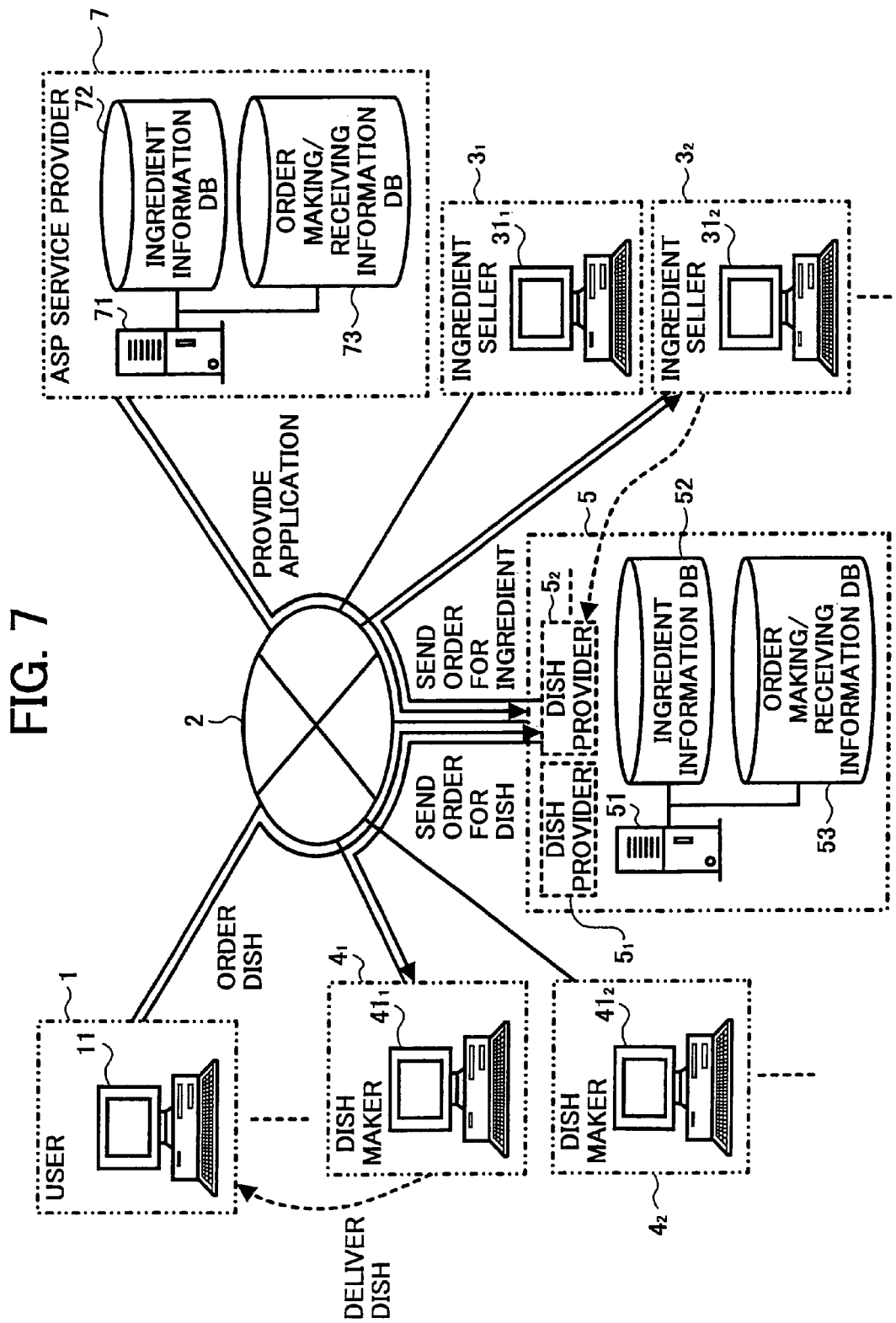

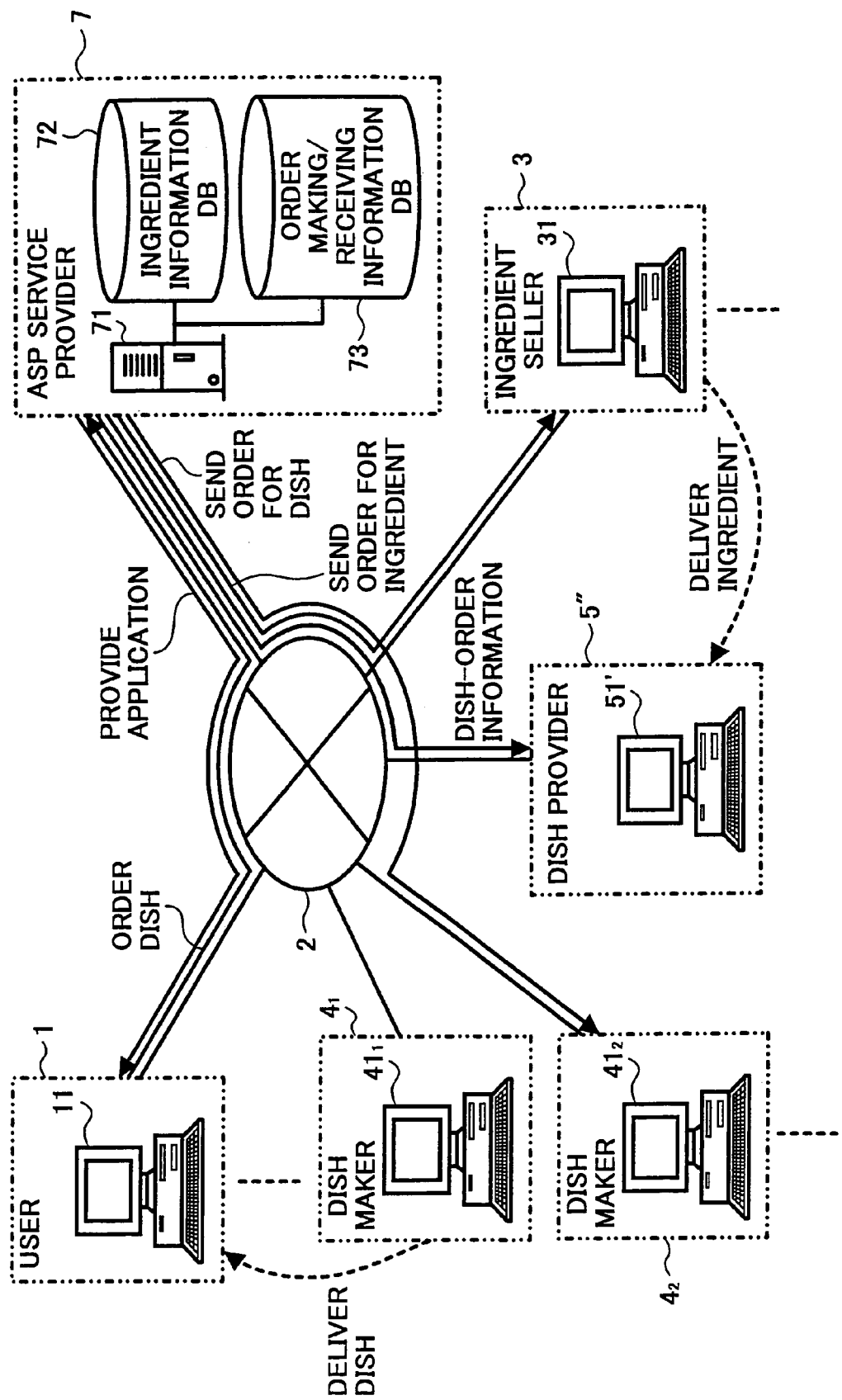

DISH-PROVIDING ASSISTING SYSTEM, DISH-PROVIDING ASSISTING APPLICATION PROVIDING SYSTEM, DISH-PROVIDING ASSISTING SOFTWARE AND RECORDING MEDIUM

BACKGROUND OF THE INVENTION

1. Field of the Invention

The present invention relates to a dish-providing assisting system, a dish-providing assisting application providing system, a dish-providing assisting software and recording medium, and, more particularly to, a dish-providing assisting system for assisting a dish maker (e.g. a meal-box maker, etc.) in forming a set (list) of dishes and in providing users with the formed set of dishes, a dish-providing assisting application providing system, software for realizing the systems, and a computer readable recording medium recording the software thereon.

2. Description of the Related Art

Conventionally, there are various applications for forming a set (a list) of dishes. Unexamined Japanese Patent Application KOKAI Publication No. H10-177598 discloses a dish-set formation system, which visualizes a dished-up state of foods included in the set of dishes and can easily form a predetermined set of dishes. According to this system, the calories or prime cost of foods can automatically be calculated and displayed, based on the modeled form of the dishes.

Unexamined Japanese Patent Application KOKAI Publication No. H9-274629 discloses a system for making orders for ingredients, specifically for easily realizing orders for ingredients simply by specifying a desired dish menu and the number of people to whom dishes are given. In this system, while a person is to make an order for ingredients, the person's requests can still be considered.

According to the above-described dish-set formation system and ingredient-ordering system, the dish provider, such as a meal-box maker, etc. can form a set of dishes and make orders for ingredients, so that general users can get necessary ingredients for dishes based on their needs.

Further, the applicant of this application has proposed, in Japanese Patent Application 2001-094896, a dish-providing assisting system for performing a series of processes for controlling a dish provider to acquire necessary ingredients for a desired set of dishes based on user's request, dish-set formation application providing system, software for realizing the systems, and computer readable recording medium recording the software thereon.

When a single dish provider requests a plurality of dish makers for dishes ordered, the dish provider can not carry out a series of processes. In the case where the sales estimation was not right, those ingredients supplied from an ingredient seller(s) may be wasted.

SUMMARY OF THE INVENTION

The present invention has been made in consideration of the above. It is accordingly an object of the present invention to provide a dish-providing assisting system for ordering a plurality of dish makers (e.g. a meal-box maker, etc.) for requested dishes, when a dish provider provides general users with dishes, and to provide also a dish-providing assisting application providing system, software for realizing the systems, and a computer readable recording medium recording the software.

Another object thereof is to provide a dish-providing assisting system for using up ingredients supplied from ingredient sellers without wasting the ingredients, a dish-providing assisting system, a dish-providing assisting application providing system, software for realizing the above systems, and a computer readable recording medium recording the software.

In order to achieve the above objects, according to the first aspect of the present invention, there is provided a dish-providing assisting system for assisting a dish provider through a network, the system comprising:

a dish-providing assisting server connected to at least one terminal device through the network;

an ingredient seller terminal device received an ingredient order from the dish-providing assisting server through the network;

a dish maker terminal device received a dish order from the dish-providing assisting server through the network;

an ingredient-information database storing ingredient information of the ingredient seller having ingredients in stock, and connected to the dish-providing assisting server and the dish maker terminal device through the network;

wherein the dish-providing assisting server forms dish-set information representing a set of dishes with reference to the ingredient-information database, provides the dish-set information and a price thereof, receives an order of the set of dishes, selects a dish maker having necessary ingredients for the order of the set of dishes, and sends the order for dishes to the dish maker terminal device.

In order to achieve the above objects, according to the second aspect of the present invention, there is provided a dish-providing assisting server for assisting a dish provider in providing at least one user with a dish, the assisting server comprising:

dish-set formation means for forming dish-set information representing a set of dishes with reference to an ingredient-information database;

dish-set providing means for providing the user with the dish-set information regarding the set of dishes and a price thereof;

dish-ordering means for controlling the user to make an order for dishes, based on the dish-set information provided by the dish-set providing means;

dish-order receiving means for receiving the order made under control of the dish-ordering means;

selection means for searching the ingredient-information database for a dish maker having necessary ingredients, and selecting the searched dish maker, based on information representing the necessary ingredients for the dishes whose order is received by the dish-order receiving means; and dish-order sending means for sending an order for dishes to the dish maker selected by the selection means.

In order to achieve the above objects, according to the third aspect of the present invention, there is provided a dish-providing assisting-application providing system, having an application providing server for sending, through a network, the system comprising:

a dish-providing assisting application based on which a dish provider provides at least one user with a set of dishes, to a dish-providing assisting server included in each of one or a plurality of dish providers, which is connected to a user client device of the at least one user through a network;

an ingredient-order receiving client device of an ingredient seller selling ingredients through a network, and also to a dish-order receiving client device of a dish maker for making a dish to be provided to the at least one user;

an ingredient-information database which stores ingredient information representing ingredients, in association with a set of dishes using the ingredients, the ingredient seller selling the ingredients and the dish maker having the ingredients in stock, wherein the application providing server further comprises:

dish-set formation means for making the user client device form dish-set information representing a set of dishes with reference to the ingredient-information database;

dish-set providing means for providing the user client device with the dish-set information regarding the set of dishes and a price thereof;

dish-ordering means for controlling the user client device to make an order for dishes, based on the dish-set information provided by the dish-set providing means;

dish-order receiving means for receiving the order made under control of the dish-ordering means;

selection means for searching the ingredient-information database for a dish maker having necessary ingredients, and selecting the searched dish maker, based on information representing the necessary ingredients for the dishes whose order is received by the dish-order receiving means; and dish-order sending means for sending an order for dishes to the dish-order receiving client device of the dish maker selected by the selection means.

In order to achieve the above objects, according to the fourth aspect of the present invention, there is provided a program for making a computer serve as the above-mentioned dish-providing assisting system, the above-mentioned dish-providing assisting server or the above-mentioned dish-providing assisting-application providing system.

In order to achieve the above objects, according to the fifth aspect of the present invention, there is provided a computer readable recording medium storing the above-mentioned program.

BRIEF DESCRIPTION OF THE DRAWINGS

These objects and other objects and advantages of the present invention will become more apparent upon reading of the following detailed description and the accompanying drawings in which:

FIG. 7 is a block diagram for explaining a dish-providing assisting system according to another embodiment of the present invention; and FIG. 8 is a block diagram for explaining a dish-set formation application providing system according to another embodiment of the present invention.

DETAILED DESCRIPTION OF THE PREFERRED EMBODIMENTS

Preferred embodiments of the present invention will now be described with reference to the accompanying drawings.

Figure 1:
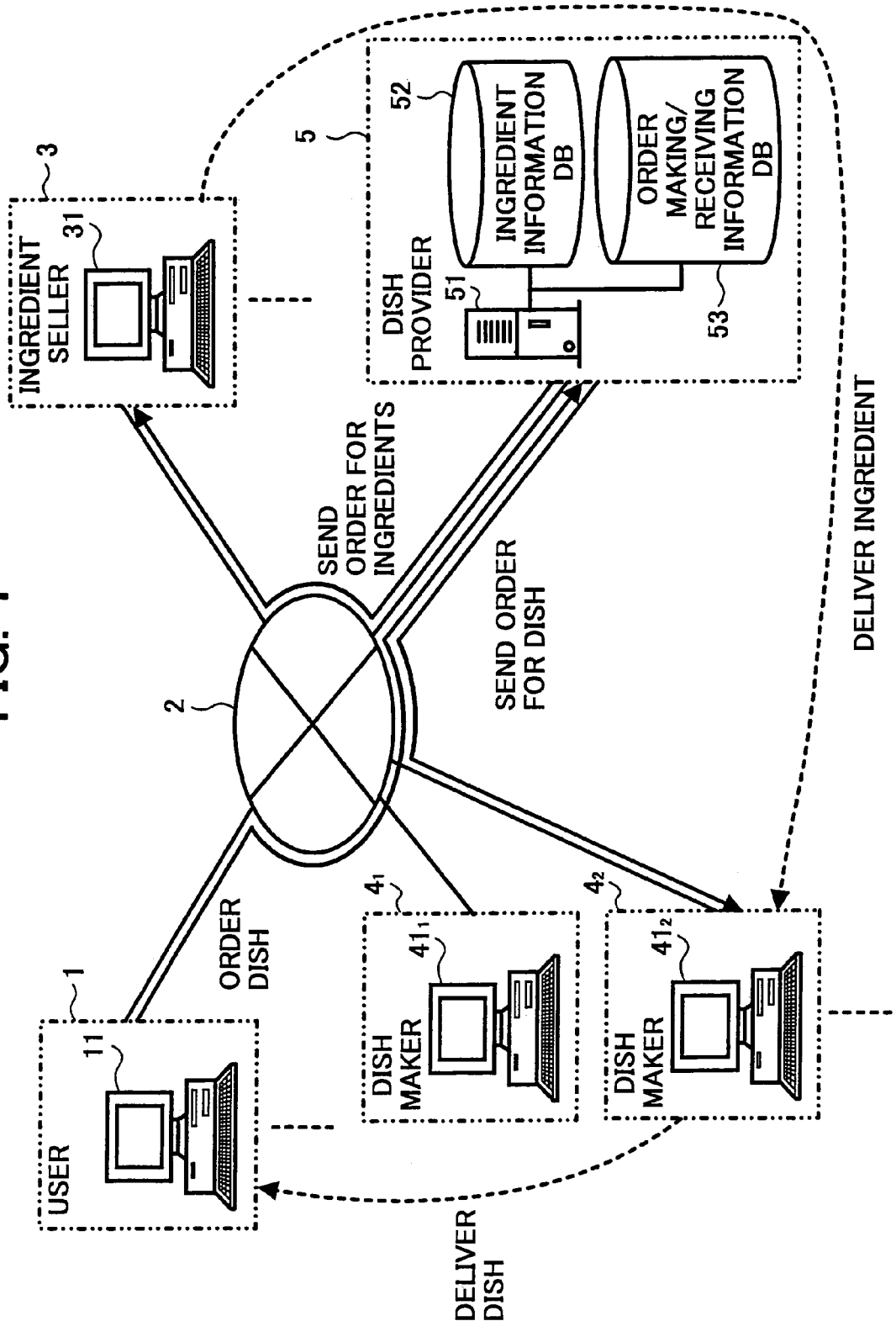
FIG. 1 is a block diagram for explaining a dish-providing assisting system according to an embodiment of the present invention.

FIG. 1 is a block diagram for explaining a dish-providing assisting system according to an embodiment of the present invention. In the dish-providing assisting system according to the embodiment of the present invention, a dish provider 5 provides users with dishes, such as meal boxes, etc., in association with one or more dish makers $4_1$, $4_2$, . . . (sometimes represented and denoted as a dish maker 4).

The present invention can be adapted in a case where the dish maker 4 is, for example, a meal-box maker of the dish provider 5. For example, the dish provider 5 classifies a plurality of dish makers according to their food type, such as "Italian", "Japanese", "Chinese", and the like. Then, the dish provider 5 can order the plurality of dish makers to make dishes requested by users, in accordance with the type of the requested dishes. The dish provider 5 may be in cooperation with a plurality of ingredient sellers 3, so that it may request the plurality of ingredient sellers 3 for ingredients for one kind of dish (meal box). Further, when requesting one kind of ingredient, the dish provider 5 may select the best ingredient seller 3 from the plurality of ingredient sellers 3, in accordance with an urgency level, the distance from the dish provider 5 to the ingredient seller 3, the price of the ingredient, etc.

A dish-providing assisting server 51 is connected to a client device 11 of a user 1 through a network 2, such as the Internet, etc., and processes an order for a dish from the user. The dish-providing assisting server 51 is further connected to a client device 31 for receiving an order for ingredient, through the network. In addition, the dish-providing assisting server 51 is connected to client devices $41_1$, $41_2$ for receiving an order for a dish, . . . (sometimes represented and denoted as a client device 41) through the network 2.

The dish-providing assisting server 51 hierarchically comprises a database server for an ingredient-information DB 52, a database server for an order making/receiving information DB 53, and a WWW server. In addition, the dish-providing assisting server 51 may further comprise a dedicated server for realizing the following means, as will be described later.

In response to a request from the client device 11, a dish-providing assisting application (for making an order for a dish(es), for creating a menu, as will be explained in this embodiment) can be used. For example, an operation for making an order for a dish(es) (including an operation for making a dish menu in this embodiment) can be achieved by the WWW browser of the client device 11 on the WWW server. In fact, the dish-providing assisting server device 51 stores the software for controlling a computer to realize the following means, as will be explained later.

Figure 2:
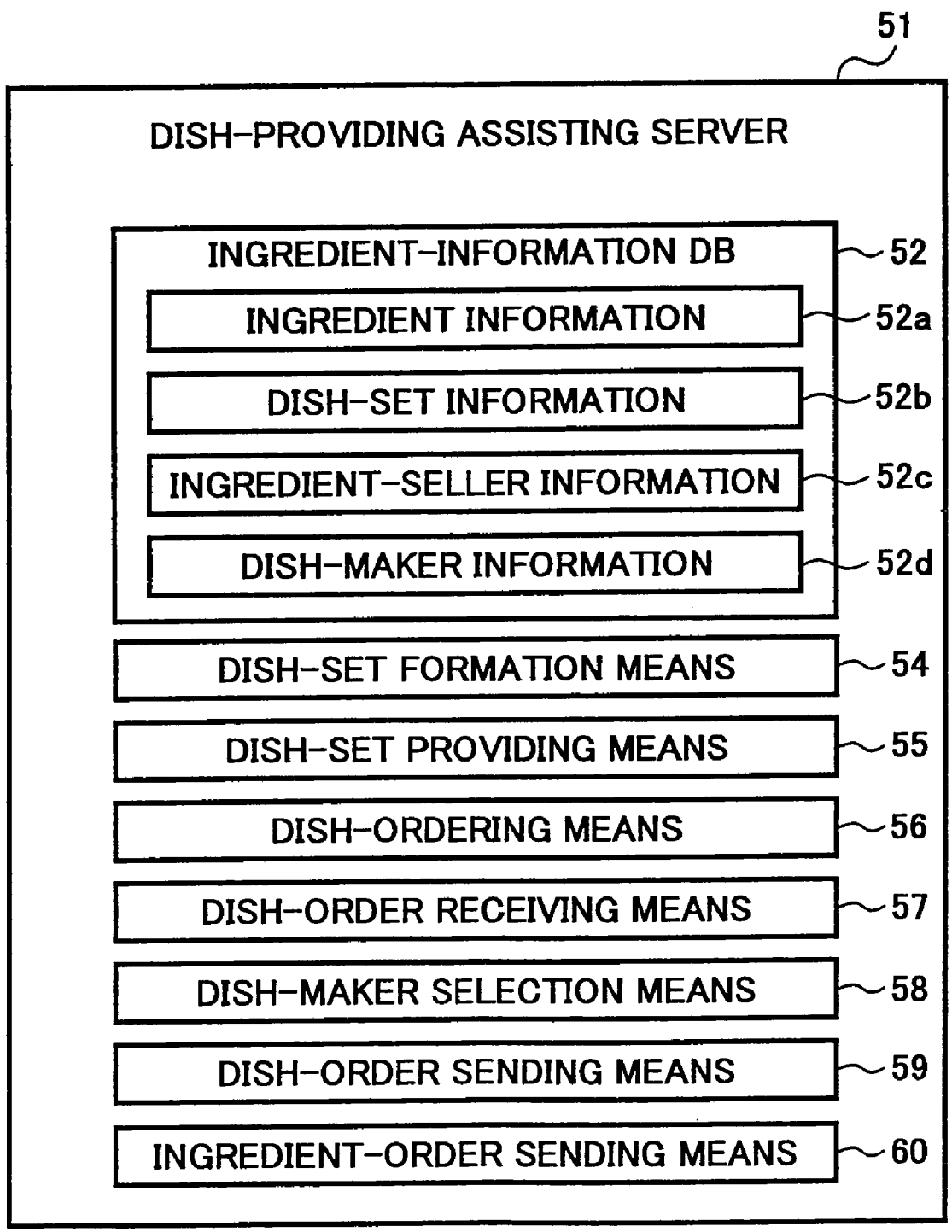
FIG. 2 is a diagram for explaining the structure of the dish-providing assisting system shown in FIG. 1.

FIG. 2 is a diagram for explaining the structure of the dish-providing assisting server device shown in FIG. 1. The dish-providing assisting server device 51 includes a dish-set formation means 54, dish-set providing means 55, dish-ordering means 56, dish-order receiving means 57, dish-maker selection means 58, and dish-order sending means 59. It is necessary that this dish-providing assisting server device 51 further include an ingredient-information DB 52 or be able to access the ingredient-information DB 52.

The ingredient information DB 52 is a database for storing information, including ingredient information 52a, dish-set information 52b, ingredient-seller information 52c, and dish-maker information 52d.

The ingredient information 52*a* includes information regarding ingredients, growing area of each ingredient, information representing whether agricultural chemicals are used/not used, calories of each ingredient, quantity, arrival date of each ingredient, etc. Any information items included in the ingredient information 52 may be selected in accordance with the usage mode of the system of the present invention and stored in the ingredient information DB 52.

The dish-set information 52*b* includes information regarding a set (list) of dishes, showing a set of dishes that can be made using predetermined ingredients, in association with ingredient information, or information regarding ingredients necessary for a set of dishes, and is stored in the ingredient information DB 52.

The ingredient-seller information 52*c* includes information regarding a general ingredient seller selling target ingredients, or information regarding an ingredient seller selling target ingredients and having made a contract with the dish provider 5, and is stored in the ingredient information DB 52 in association with the ingredient information.

The dish-maker information 52*d* includes information regarding at least one dish maker having a target ingredient in stock. For example, the dish-maker information 52*d* may include information for selecting a dish maker in association with an ingredient(s) or a set of ingredients (for making the main part of a set of dishes or the entire set of dishes).

Note that ingredient information may be in such a form that the ingredient seller 3 can directly input using the client device 31. In this case, it is necessary to input the prime cost of each ingredient. In this case, in the ingredient information DB 52, it is necessary to store information regarding ingredients purchased at the ingredient seller 5 or consumed ingredients, in association with ingredient information input at the ingredient seller 3. If the prime cost of each ingredient is input from each ingredient seller 3, the cost for a dish corresponding to the input cost can be set. Further, the sale price of the dish, which is made using the ingredients equivalence to the prime cost of ingredient, is set in proportion to its prime cost, so that the user 1 can always have the reasonable dish provided from the dish provider 5.

The dish-set formation means 54 is means for forming a set of dishes, with reference to the ingredient-information DB 52. Examples of the dish-set formation means 54 are a dish-set formation application and its updated form of the application. Likewise a dish-set formation application disclosed in Unexamined Japanese Patent Application KOKAI Publication No. H10-177598, according to the above dish-set formation application, those ingredients included in a set of dishes are visualized in their dished up form, and their conditions are easily input, and hence forming a desired set of dishes. Further, the calories and prime costs of those ingredients included in the set of dishes are calculated based on the modeled form of the foods, and the calculated calories and costs may be displayed.

Alternatively, the dish provider 5 may create a menu (customized dishes) only for the dish provider, using the dish-set application, and display the created menu, and hence assisting the user in forming a desired set of dishes based on the displayed menu. For example, there is a method of incorporating the created menu in the template form of the dish-set application. In this case, there may be employed a system for adding the price corresponding to the customized dish, and charging the user 1 for the meal box(es). That is, the dish-set formation application is for displaying the menu for each dish provider created in advance by the dish provider 5, on the client device 11 of the user 1 together with its price. In the case where there is a change (customization) in the menu, the price corresponding to the customized dish is provided.

The dish-set formation means 54 may be means for controlling the client device 11 of the user 1 to form a set of dishes with reference to the ingredient information DB 52. In this case, the dish-set formation means 54 (e.g. the dish-set formation application) in the dish-providing assisting server 51 is activated by the WWW browser as the WWW client through the network 2, thereby forming a set of dishes.

The dish-set providing means 55 is means for providing the client device of the user with dish-set information regarding the predetermined set of dishes and their corresponding price. Not just by the dish-set formation means 54, a set of dishes may be formed based on a recipe acquired through the Internet or the order history of the user 1, as will be described later. The dish-set providing means 55 can include means for attaching the calorie information of the set of dishes formed by the dish-set formation means 54, thereto, and providing the calorie information and the set of dishes in association with each other.

The dish-ordering means 56 is means for controlling the client device 11 of the user 1 to make an order for a predetermined dish(es) based on the set of dishes which are provided by the dish-set providing means 55. The dish-order receiving means 57 is means for receiving the order for the predetermined dish(es) that is made by the dish-ordering means 56. It is preferable that information regarding the predetermined dish whose order is received by the dish-order receiving means 57 be stored in the order making/receiving information DB 53. According to a method of making an order for a dish(es), as is employed by the dish-ordering means 56, a predetermined dish(es) is ordered weekly or monthly based on a weekly menu or monthly menu provided by the dish-ordering means 56. The dish-set providing means 55 and/or dish-ordering means 56 may be incorporated with the above-described dish-set formation application.

One of the features of the present invention is the dish-maker selection means 58. The dish-maker selection means 58 searches the ingredient-information DB 52 for a dish maker having necessary ingredients in stock.

FIG. 1 shows a case wherein the dish maker 42 is selected as a dish maker which is to make the ordered dish. The dish-order sending means 59 sends an order for a dish to the client device 41 (specifically the client device 41$_2$ in the case of FIG. 1) of the dish maker which has been selected by the dish-maker selection means 58, through the network. That is, the dish provider 5 can automatically select the dish maker 4 which is in charge of making the dish ordered based on the set conditions, on the dish-providing assisting server 51.

According to another embodiment of the present invention, the dish-set formation means 54 may include means for forming a set of dishes using ingredients that should be used pretty soon, based on "best" date information, representing dates before that ingredients should be used best, which is stored in the ingredient information DB 52. In this case, the ingredient information 52*a* stored in the ingredient information DB 52 may include information regarding the "best" dates of the ingredients.

The dish-set formation means 54 may include purpose-input means and purpose-achievement schedule formation means. The purpose-input means is for inputting body (health) information of the individual user. The purpose-achievement schedule formation means is for obtaining purpose-achievement software, which forms the necessary set of dishes for achieving the purpose and which also schedules the dates necessary for achieving the purpose, based on the input body information.

When the dish-maker selection means 58 searches the ingredient information DB 52 for a dish maker based on those ingredients necessary for the dish ordered by the dish-order receiving means 57, the dish maker 4 which holds ingredients in stock to be best used soon is given priority. At this time, the ingredient information 52a stored in the ingredient information DB 52 may include information regarding the "best" dates of the ingredients.

Based on the ingredients necessary for the dish ordered, the dish-maker selection means 58 searches the ingredient information DB 52 for a dish maker holding ingredients, which are quite expensive and should be best used quite soon, in stock. In this case, the searched dish maker is given priority as a dish maker to be using ingredients.

Further, the dish-maker selection means 58 may search or select a corresponding dish maker, in accordance with the frequency of orders for dishes to be made by the dish maker. At this time, it is necessary to record the order history regarding orders made to each dish maker, in the order making/receiving information DB 53.

To use information representing the "best" dates of ingredients, the dish-set providing means 55 may include means, for referring to the ingredient information DB 52 and for providing information regarding ingredients that should best be used soon based on the referred ingredient information DB 52. By this, the stock of those ingredients that are desired to efficiently be used is decreased, by showing information representing such ingredients in association with their special prices. The dish-set providing means 55 shows a set of dishes using the ingredients that should be used best soon, in association with their lowered prices, thereby enhancing the use of such ingredients.

The ordering of ingredients is performed by ingredient-order sending means 60. This ingredient-order sending means 60 is included in the dish-providing assisting server 51. In this structure, an order for those ingredients necessary for the dish ordered can be sent to the client device 31 through the network 2. Each dish maker 4 receives the supply of a predetermined number of ingredients at predetermined intervals. As the timing for making an order for ingredients, each dish maker 4 can sum up the orders for dishes, calculate the frequency of each ingredient, and estimate a suitable number of ingredients and a suitable timing for ordering the ingredients, so as to receive the supply of the ingredients. In accordance with the number of ingredients that should be used best soon, the ordering of the ingredients may be limited. The ingredients ordered may be delivered to each dish maker 4 through the dish provider 5. Those ingredients can directly be delivered to the dish maker 4. In this case, it is necessary to affix information representing that those ingredients are to directly be delivered to the dish maker 4, to the ingredient-order making information.

A dish made by the dish maker 4 is delivered to a place specified by the user having ordered the dish. The delivery may directly be performed by the dish maker 4 having made the dish, or the dish may be collected once by the dish provider 5 so as to deliver the collected dish to the user.

At the point that the dish-providing assisting server 51 refers to the order making/receiving information DB 53 or that the ordering is made/received, the price for the dish ordered is charged to the client device 11 of the user 1, based on the order.

Alternatively, the payment for the ingredients made be made to the client device 31 based on the order for the ingredients. In this case, the payment may be settled using an electronic technique or any other method.

Further, the ordering of ingredients may be achieved using an electronic technique. In this technique, there may be a rule that the ordering is finally achieved after the electronic settlement is performed. The dish provider 5 charges the user 1 for the dish ordered by the user. In this case, the payment may be achieved using the electronic settlement or performed on delivery.

One primary example of the electronic settlement is digital money that the monetary value is represented by digital information. The digital money is to be used as settlement means for the e-commerce on the network, such as the Internet, etc. The monetary value of the digital money may be recorded on an IC card, which is in a business-card form with a microprocessor incorporated therein. The reading/writing of the monetary value onto/from the IC card is done using a dedicated terminal device, and the IC card can be carried in place of cash.

Note that the electronic settlement in this case may include the means for performing settlement on the network, by inputting a card number (and a corresponding code number) of a debit card, credit card, etc.

Figure 3:
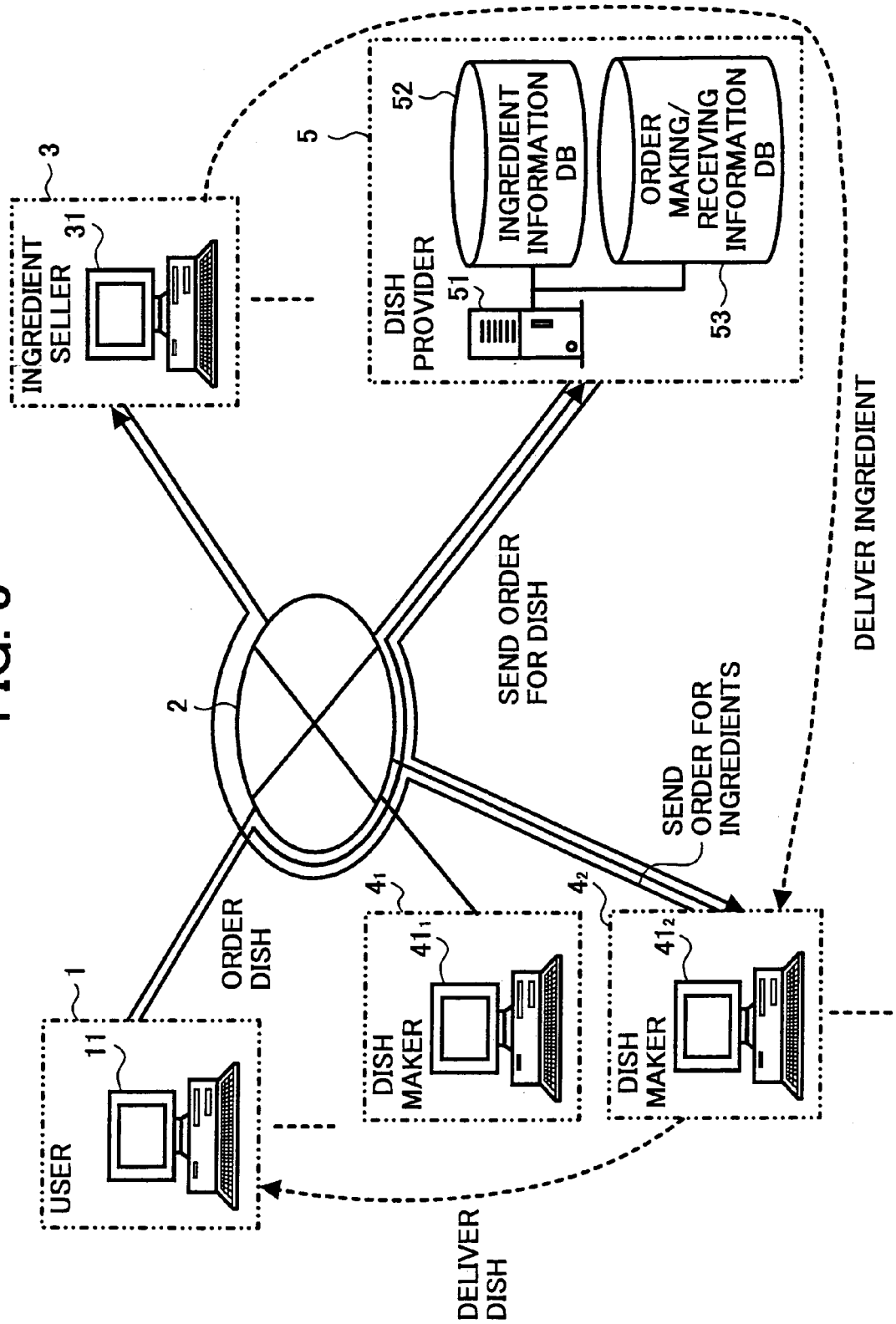
FIG. 3 is a block diagram for explaining a dish-providing assisting system according to another embodiment of the present invention.

FIG. 3 is a block diagram for explaining a dish-providing assisting system according to another embodiment of the present invention. As shown in FIG. 3, the client device 41 of each dish maker 4 includes the above-described ingredient-order sending means 60. In this structure of the system, an order for those ingredients necessary for a dish ordered by the dish-order sending means 59 may be sent to the client device 31 through the network. Those ingredients may be delivered to the dish maker 42 having made the dish using the ingredients or to the dish provider 5.

Figure 4:
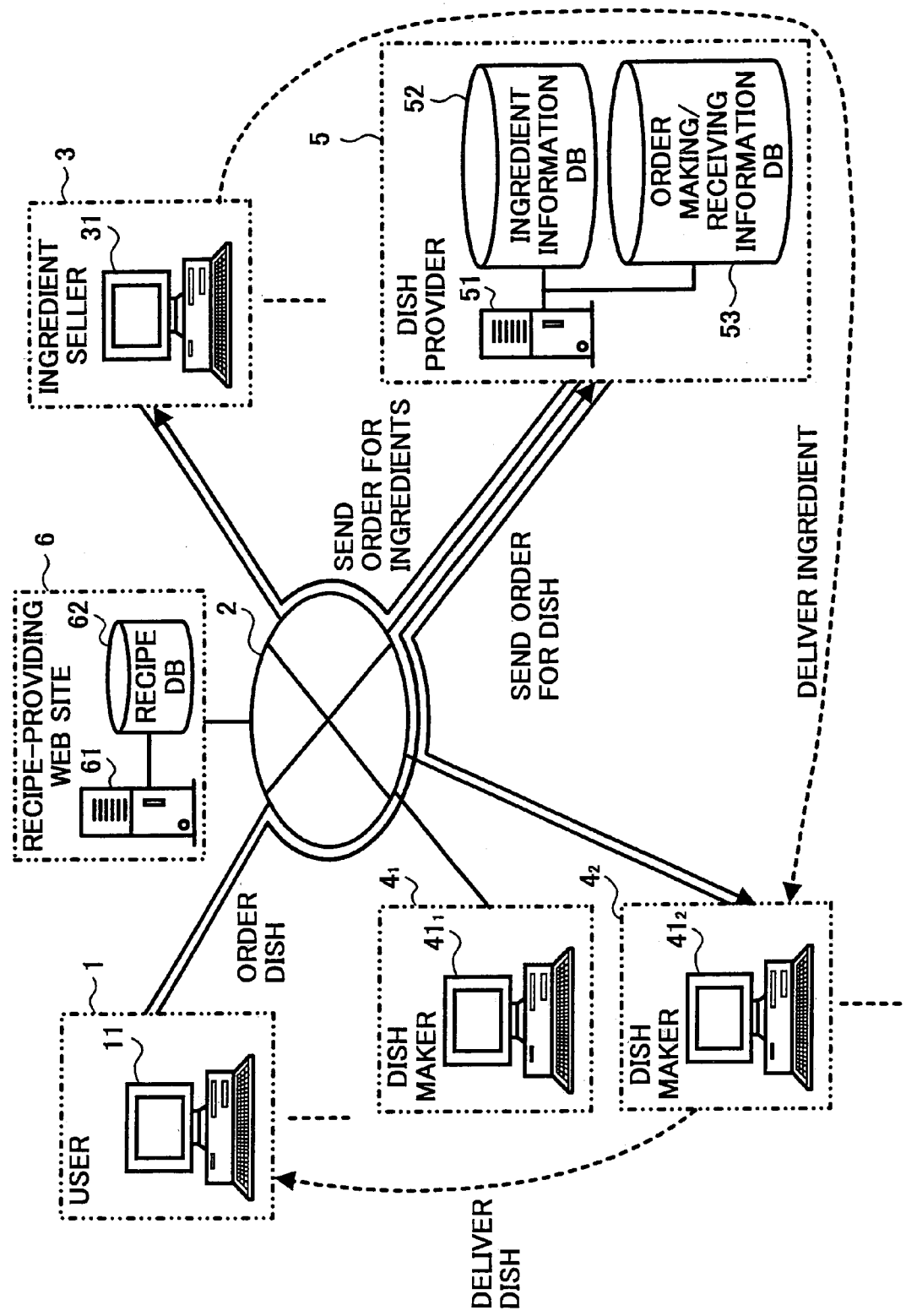
FIG. 4 is a block diagram for explaining a dish-providing assisting system according to another embodiment of the present invention.

FIG. 4 is a block diagram for explaining a dish-providing assisting system according to another embodiment of the present invention. In the dish-providing assisting system of this embodiment, the dish-set providing means 55 may include means for acquiring the set of dishes provided by the dish-set provided through the network, and providing the acquired set of dishes. The set of dishes (stored in a recipe DB 62), provided by the dish-set provider on a recipe-providing Web site 6 stored in the WWW server, may be downloaded in advance or when forming the set of dishes. By this, dish-set data which is stored externally from the dish-providing assisting server 51 can be used.

The explanations have been made to the dish-providing assisting systems according to the preferred embodiments of the present invention. The present invention can be employed as a dish-providing assisting application service providing system for providing dish providers with the functions of the above-described dish-providing assisting systems in the form of an application. The dish-providing assisting application service providing system will now be described. Note that the same elemental components are denoted by the same reference numerals as those included in the dish-providing assisting systems of the above embodiments.

Figure 5:
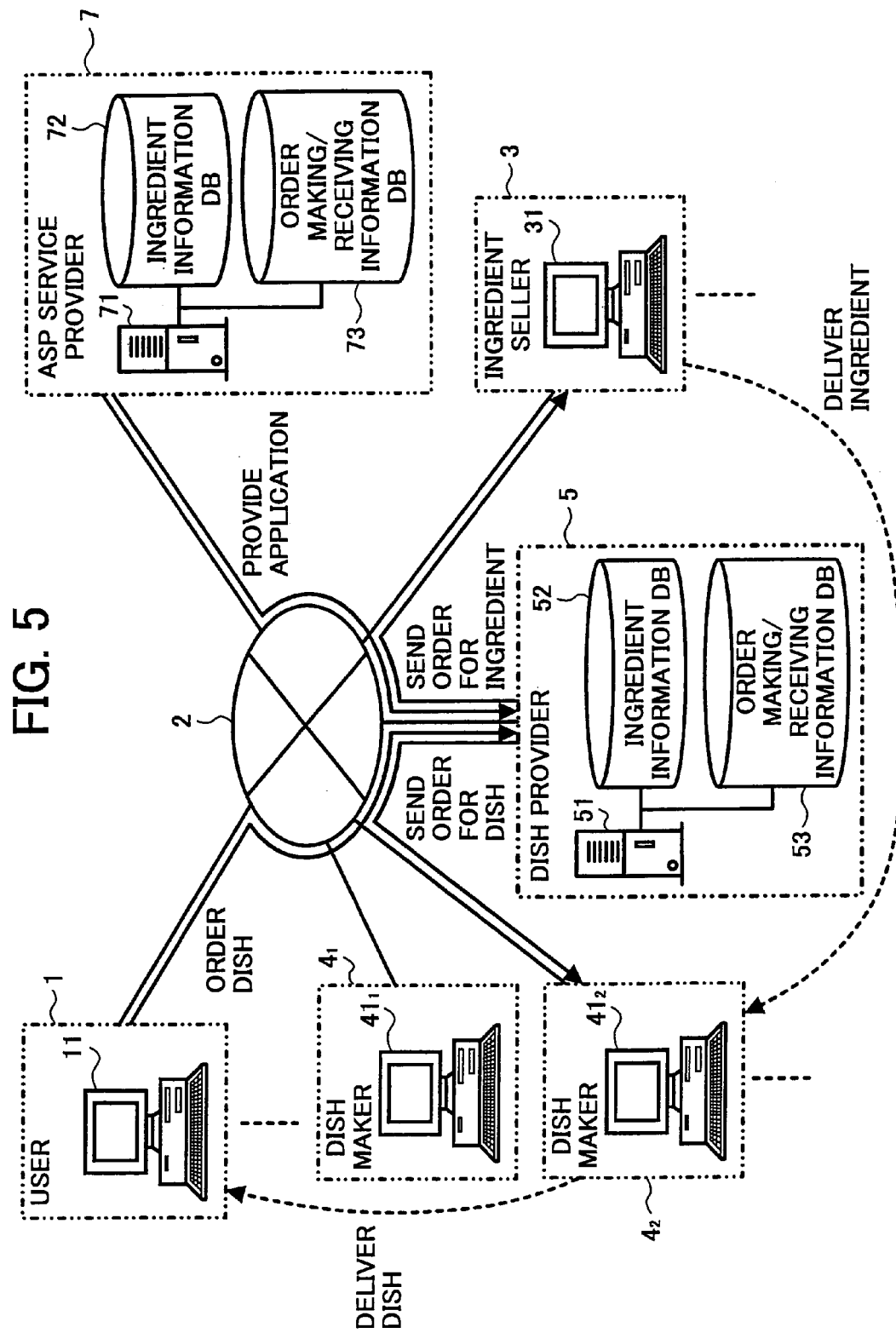
FIG. 5 is a block diagram for explaining a dish-providing assisting system according to another embodiment of the present invention.

FIG. 5 is a block diagram showing a dish-providing assisting application service providing system according to another embodiment of the present invention.

The dish-providing assisting application service providing system of this embodiment is a system wherein the dish provider 5, such as a meal-box provider, etc., caters for the user with dishes, in cooperation with an ASP service provider 7. The ASP service provider 7 includes an application service providing server (hereinafter referred to as an ASP server) 71 which provides the dish-providing assisting server 51 of the dish provider 5 with a dish-providing assisting application for providing the user 1 with dishes, through the network 2, etc. The ingredient information DB 52 may be included in or connected to the dish-providing assisting server 51 together with the order making/receiving information DB 53. Otherwise, the ingredient information DB 52 and the order making/receiving information DB 53 may be included in the ASP server 71, or may be connected respectively to an ingredient information DB 72 and an order making/receiving information DB 73.

Note that the order making/receiving information DB may be necessary in a system for charging the user for a provided service, as will be described later. It is necessary that the system of this embodiment is in such environment that the ASP service provider 7 can acquire corresponding order making/receiving information when an order is made/received, or that the ASP service provider 7 can always acquire the past record (may be within a predetermined period of time) of the order making/receiving information. For example, the order making/receiving information DB needs to be connected to the ASP server 71 using an arbitrary method, in association with the ingredient information DB.

In this case, the ASP server 71 can refer to the ingredient information DB 52 or 72, or use the dish-set formation application including the ingredient information DB 72, using the WWW browser of the dish-providing assisting server 51 (serving as a client device of the ASP server 71) of the dish provider 5, from the WWW server of the ASP server 71. For example, the ASP server 71 may hierarchically comprise a database server for the ingredient information DB 72, a database server for the order making/receiving information DB 73, and a WWW server. Further, the ASP server 71 may include servers for realizing the above-described means. In fact, the dish-providing assisting server 51 or ASP server 71 adequately stores the software for controlling a computer to realize the above-described means.

The dish-providing assisting server 51 installed in the dish provider 5 is connected to the ASP server 71n through the network 2, and receives the dish-providing assisting application therefrom. The dish-providing assisting server 51 is connected to the client device of each of a plurality of users 1 through the network 2. The dish-providing assisting server 51 is connected also to the client device 31 of each ingredient seller 3 selling ingredients through the network 2. Further, the dish-providing assisting server 51 is connected to the client device 41 of the dish maker 4 to be making a dish that the dish provider 5 provides the user, through the network. The dish provider 5 may be in cooperation with a plurality of ingredient sellers 3. The dish provider 5 may request the plurality of ingredient sellers 3 for one kind of dish (one kind of meal box). Further, when requesting one kind of ingredient, the dish provider 5 may select the best ingredient seller 3 from the plurality of ingredient sellers 3, in accordance with an urgency level, the distance from the dish provider 5 to the ingredient seller 3, the price of the ingredient, etc.

The dish-providing assisting server 51 may hierarchically comprise a database server for the ingredient-information DB 52, a database server for the order making/receiving information DB 53, and a WWW server. Further, the dish-providing assisting server 51 may also include a server for realizing the above-described means in cooperation with the ASP server 71. The dish-set formation application can be operated by the WWW browser of the client device on the WWW server, or an order making operation can be realized using the dish-set formation application.

In this case, for example, in response to a request from the client device 11, a link is established between the client device 11 and the ASP server 71 for using the dish-providing assisting application (the program for making an order for a dish, as is used by the user, and the program for forming a set of dishes, as is explained in this embodiment).

The dish-providing assisting server 51 includes a WWW server. In the case where the client device 11 of the user 1 accesses a dish-ordering WWW site (a WWW site for forming a set of dishes or making an order for a dish), from its WWW browser through the Internet, the dish-set formation application, such as a dish-set formation system disclosed in Unexamined Japanese Patent Application KOKAI Publication H10-177598, is used by the client device 11, thereby making an order for a dish.

The dish-providing assisting server 51 lets the client device 11 of the user 1 make an order for a dish(es) based on a formed set of dishes, and receives the order for the dish(es). In this case, the set (list) of dishes may be formed by any of the dish provider 5, the user 1, the recipe provider, as described above. The dish-providing assisting server 51 calculates the quantity of ingredients necessary for the dish, and sends an order for the calculated quantity of the ingredients to the client device 31 through the network 2. In this case, the dish-providing assisting server 51 may send an order for the ingredients necessary for a set of dishes, at the time an order for the set of dishes is received. Otherwise, the dish-providing assisting server 51 may understand the consumption of each ingredient based on the past record of the orders, so as to estimate and make an order for the future needs. The client device 31 having received an order for the ingredients delivers the ingredients to the dish provider 5 or dish maker 4.

The ASP server 71 can charge the dish-providing assisting server 51 (or the dish provider 5) for the application, based on the order for a dish(es) or for ingredients, at the time the order making/receiving information DB 53 (may be included in the DB 73) is referred or the order is made/received. The billing/charging for the provided service may be achieved in the form of electronic payment or using any other method.

In this case where the electronic settlement is to be achieved at the time the order for ingredients is made, there may be a rule that the ordering is finally achieved after the electronic settlement is performed. The dish provider 5 charges the user 1 for the dish ordered by the user. In this case, the payment may be achieved using the electronic settlement or performed on delivery.

Figure 6:
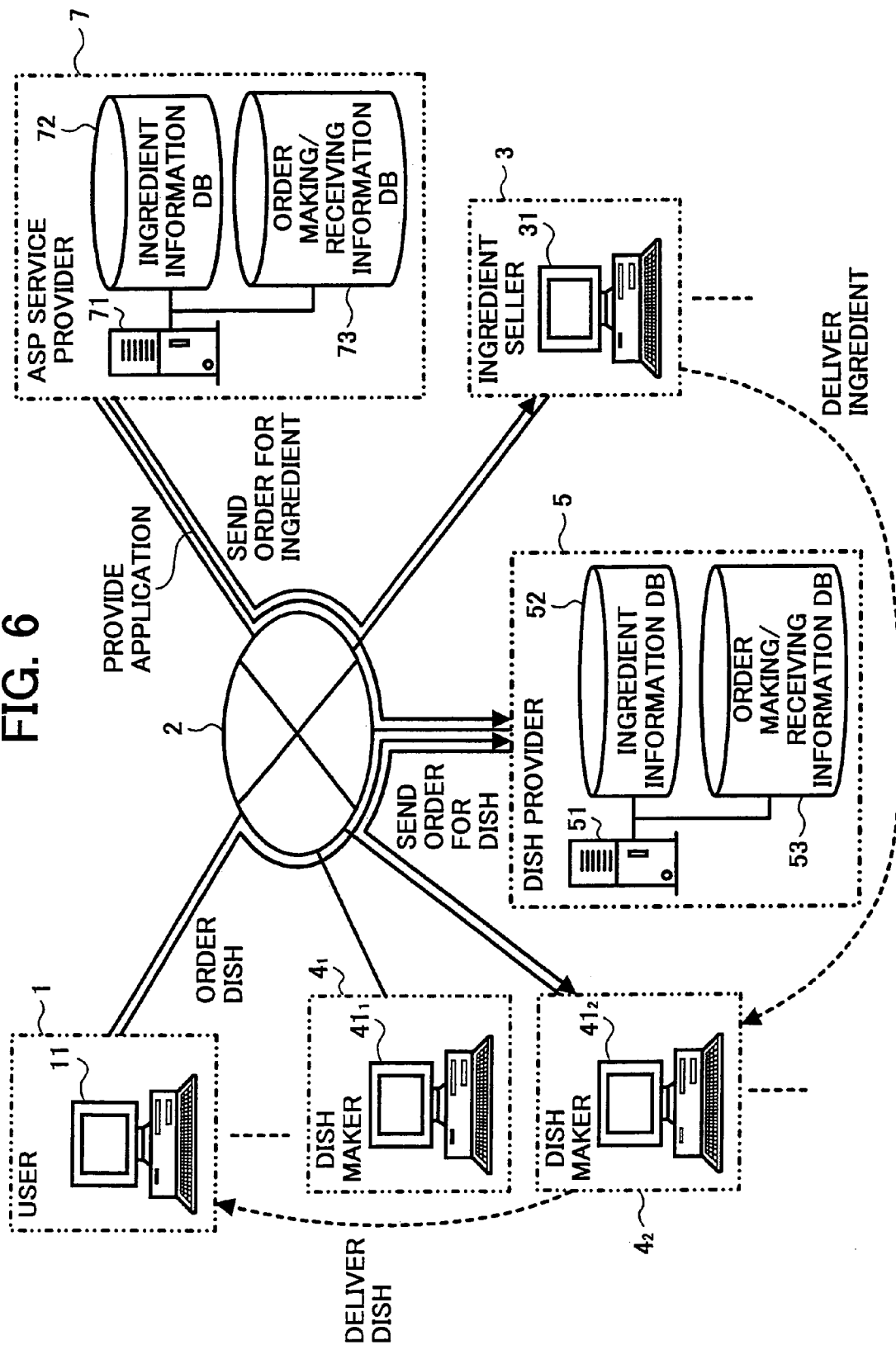
FIG. 6 is a block diagram for explaining a dish-providing assisting system according to another embodiment of the present invention.

FIG. 6 is a block diagram showing a dish-providing assisting application service providing system (ASP system) according to another embodiment of the present invention. Because the primary structure of the ASP system according to this embodiment of the present invention is the same as that of the system described in the above embodiment, it will not be explained again in this embodiment. However, an ordering method of ordering ingredients based on the orders for dishes is different between the ASP system of this embodiment and the system of the above embodiment. The dish-providing assisting server 51 of the dish provider 5 causes the client device 11 to make an order for dishes based on a formed set of dishes, and receives the order for the dishes. Upon reception of the order for the dishes, the dish-providing assisting server 51 causes the ASP server 71 to make an order for necessary ingredients based on the received order. In this case, the order is sent to the client device 31 through the network 2.

FIG. 7 is a block diagram for explaining a dish-providing assisting system according to another embodiment of the present invention. The primary structure of the ASP system according to this embodiment is substantially the same as that of the system described in the above embodiment, so that it will not be described again in this embodiment. The only difference between the two systems is that the dish-providing assisting application is provided to a plurality of servers (devices).

The dish-providing assisting system according to this embodiment is a system, wherein a plurality of dish providers $5_1$, $5_2$, . . . perform catering for the user 1 with dishes, such as meal boxes, etc., in cooperation with the ASP service provider 7. The ASP service provider 7 includes an application-providing server (hereinafter referred to as an ASP server) 71 for providing a dish-set formation application. The ASP service provider 7 includes an application-providing server (hereinafter referred to as an ASP server) 71 for providing the dish-providing assisting server 51 of the dish provider 5 with a dish-providing assisting application for providing the user with dishes.

The ASP server 71 can refer to the ingredient information DB 52 or 72, or use the dish-set formation application including the ingredient information DB 72, using the WWW browser of the dish-providing assisting server 51 (serving as a client device of the ASP server 71) of the dish provider $5_1$, $5_2$ (sometimes represented as a dish provider 5'), . . . , from the WWW server of the ASP server 71. The ASP server 71 may hierarchically comprise a database server for the ingredient information DB 72, a database server for the order making-receiving information DB 73, and the above-described WWW server. In addition to this, the ASP server 71 may include a server for realizing the above-described means. In fact, the dish-providing assisting server 51 or the ASP server 71 adequately stores software for controlling a computer to realize the above means.

The dish-providing assisting server 51 of each of a plurality of dish providers 5' is connected to the ASP server 71 through the network 2, and receives the application supplied therefrom. The dish-providing assisting server 51 is connected to the client device 11 of each of the plurality of users 1 through the network 2. Further, the dish-providing assisting server 51 is connected to the client device $31_1$, $31_2$, . . . (sometimes represented as a client device 31) of the respective ingredient sellers $3_1$, $3_2$, . . . (sometimes represented as an ingredient seller 3), through the network 2.

The dish-providing assisting server 51 causes the client device 11 of the user 1 to make an order for dishes based on a formed set of dishes, and receives the order therefrom. The dish-providing assisting server 51 selects a suitable dish maker 41, and request the selected dish maker 41 for making the set of dishes ordered by the client device 11. The dish-providing assisting server 51 calculates the quantity of each of the ingredients required for the dishes, and sends an order for the calculated quantity of the ingredients through the network 2. For example, in the case where an order for dishes to be provided from the dish provider $5_2$ is received, the dish provider 52 sends an order for the ingredients necessary for the dishes to a cooperated ingredient seller (e.g. the client device $31_2$ of the ingredient seller $3_2$). Upon this, the ingredients may be delivered to the dish provider $5_2$ or the dish maker $4_1$.

The dish-providing assisting server 51 may instruct the ASP server 71 to request the client device 31 for the necessary ingredients.

In this case, the dish-providing assisting server 51 may send an order for the ingredients necessary for a set of dishes, at the time an order for the set of dishes is received. Otherwise, the dish-providing assisting server 51 may acquire the consumption of each ingredient based on the past record of the orders, so as to estimate and make an order for the future needs. The client device 31 having received an order for the ingredients delivers the ingredients to the dish provider 5'.

The ASP server 71 can charge the dish provider 5' or directly the dish-providing assisting server 51 for the application, based on the order for a dish(es) and/or for ingredients, at the time the order making/receiving information DB 53 (may be included in the DB 73) is referred or the order is made/received. The billing/charging for the provided service may be achieved in the form of electronic payment or using any other method.

In this case where the electronic settlement is to be achieved at the time the order for ingredients is made, there may be a rule that the ordering is finally achieved after the electronic settlement is performed. The dish provider 5 charges the user 1 for the dish ordered by the user. In this case, the payment may be achieved using the electronic settlement or performed on delivery.

Explanations will now be made to a dish-providing assisting application service providing system, mainly including the server 71 of the ASP service provider 7 included in the above-described embodiments, with reference to FIG. 8. The primary structure of the dish-providing assisting application service providing system is substantially the same as that of each of the above-described embodiments, so that it will not be explained again in this embodiment.

FIG. 8 is a block diagram for explaining a dish-set formation application service providing system according to another embodiment of the present invention. In the dish-set formation application service providing system (hereinafter referred to as a present system) of this embodiment, there are both cases in which one dish provider is employed and a plurality of dish providers are employed.

Further, in the dish-set formation application service providing system of this embodiment, the same service(s) is(are) provided to the user as that given by the dish-providing assisting system of the above-described embodiments. In the structure of the dish-set formation application service providing system of this embodiment, a dish provider 5" does not include the dish-providing assisting server, the ingredient information DB and the order making/receiving information DB, unlike the above. Instead of these, the dish provider 5" includes a dish-providing assisting server (as a server from the perspective of the user 1) serving as a client device 51' of the dish provider. That is, the dish provider 5" requests the ASP service provider 7 to provide a service to the user 1, and receives only orders for dishes.

According to the system of this embodiment, the ASP server 71 directly forms a set of dishes, makes orders for dishes (ingredients), and selects a suitable dish maker 4. In this structure, the dish provider 5" receives only the orders for dishes from the ASP server 71. The formation of the menu only for the dish provider 5", the specification of the ingredient seller 3, dish maker 4, etc., and any other operations to be achieved beforehand are not limited to the above.

The present invention has been described, while mainly describing the dish-providing assisting systems and the dish-providing assisting application service providing system according to the above embodiments. As explained above, the present invention can be adapted as software for: controlling a computer to serve as one of the above-described systems; or controlling a computer to execute operations of the systems, or as a computer readable recording medium which stores the software.

Explanations will now be made a recording medium which records the software or data for realizing the functions of the above dish-providing assisting system or dish-providing assisting application service providing system. Specifically, this recording medium may be a CD-ROM, a magneto-optical disk, a DVD-ROM, an FD, a flash memory, or any other ROM or RAM. The recording medium, recording the software for controlling a computer to realize the functions and systems of the above embodiments, is distributed, so that the above-described systems can easily be realized. Such a recording medium is installed into an information processor, such as a computer, etc., and the software recorded on the recording medium is read out therefrom. Otherwise, the software is recorded on the recording medium included in the information processor, and is read out as needed. By this, the systems of the above embodiments can be executed.

As explained above, according to the embodiments of the present invention, when the dish provider, such as a mealbox provider, etc. provides general users with dishes, it is possible to order a plurality of dish makers (e.g. dish-making factories or the like) to make the dishes. According to the present invention, those ingredients are less likely to be wasted.

The system of the present invention can be realized by a general computer, without the need for a dedicated system. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the system of the present invention. The above program and data may be stored in a disk device or the like in the server device on the Internet, and embedded in a carrier wave. The program and data embedded in the carrier wave may be downloaded into the computer so as to realize the system of the present invention.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-149259 filed on May 18, 2001, and including specification, claims, drawings and summary. The disclosure of the above Japanese Patent Application is incorporated herein by reference in its entirety.

What is claimed is:

1. A dish-providing assisting system for assisting a dish provider through a network, said system comprising:
   a dish-providing assisting server connected to a plurality of terminal devices through said network;
   a plurality of dish maker terminal devices which receive a dish order from said dish-providing assisting server through said network, the plurality of dish maker terminal devices corresponding to a plurality of dish makers;
   an ingredient-information database which stores ingredient information regarding ingredients, a set of dishes using said ingredients, and information regarding a plurality of dish makers having said ingredients in stock, and which is connected to said dish-providing assisting server through said network;
   wherein said dish-providing assisting server forms a piece of dish-set information representing a set of dishes with reference to said ingredient-information database, provides said piece of dish-set information and a price of said set of dishes, receives an order of said set of dishes, selects a dish maker having necessary ingredients in stock for said order of said set of dishes from the plurality of dish makers having said ingredients in stock with reference to said ingredient-information database, and sends said order of said set of dishes to a dish maker terminal device corresponding to the selected dish maker.

2. The dish-providing assisting system according to claim 1 wherein
   said ingredient-information database stores use-by date information regarding dates before which said ingredients should be best used; and
   said dish-providing assisting server forms said piece of dish-set information representing said set of dishes using close-to-date ingredients of which use-by dates are within a predetermined range of time after a time point when said piece of dish-set information is formed, with reference to said ingredient-information database, and selects said dish maker having said close-to-date ingredient in stock, with reference to said ingredient-information database.

3. The dish-providing assisting system according to claim 2 wherein said dish-providing assisting server provides said piece of dish-set information representing said set of dishes using said close-to-date ingredient, in association with a lowered price than its previous price.

4. The dish-providing assisting system according to claim 1 wherein said dish-providing assisting server selects said dish maker in accordance with frequency of orders for dishes to be made by said dish maker.

5. The dish-providing assisting system according to claim 1 wherein said dish-providing assisting server affixes calorie information to said piece of dish-set information, and provides calorie information affixed thereto.

6. The dish-providing assisting system according to claim 1 further including a purpose-input terminal device for health information of individual user.

7. The dish-providing assisting system according to claim 6 wherein said purpose-input terminal device has a purpose achievement software for calculating said set of dishes necessary, for achieving said input purpose and for scheduling dates for achieving said purpose, based on said health information and purpose.

8. The dish-providing assisting system according to claim 1 further comprising:
   an ingredient seller terminal device receiving an ingredient order from said dish-providing assisting server through said network;
   wherein said ingredient seller terminal device receives an order for ingredients necessary for said set of dishes through said network.

9. The dish-providing assisting system according to claim 1 wherein said dish maker terminal device sends a bill for dish-providing to said dish-providing assisting server through said network.

* * * * *